(12) United States Patent
Tseng et al.

(10) Patent No.: US 8,086,938 B2
(45) Date of Patent: *Dec. 27, 2011

(54) METHOD FOR PROCESSING NOISE INTERFERENCE

(75) Inventors: Pao-Ching Tseng, Hsin Chu (TW); Shu-Fang Tsai, Hsin Chu (TW); Chuan Liu, Jen Te Hsiang (TW)

(73) Assignee: Mediatek Inc., Hsin Chu (TW)

( * ) Notice: Subject to any disclaimer, the term of this patent is extended or adjusted under 35 U.S.C. 154(b) by 1039 days.

This patent is subject to a terminal disclaimer.

(21) Appl. No.: 11/960,555

(22) Filed: Dec. 19, 2007

(65) Prior Publication Data

US 2008/0104480 A1    May 1, 2008

Related U.S. Application Data

(63) Continuation of application No. 11/039,948, filed on Jan. 24, 2005, now Pat. No. 7,343,545.

(30) Foreign Application Priority Data

Apr. 22, 2004    (TW) ................................ 93111174 A

(51) Int. Cl.
   *G11C 29/00* (2006.01)
   *H03M 13/00* (2006.01)
(52) U.S. Cl. ...................................................... 714/769
(58) Field of Classification Search .................... 714/769
   See application file for complete search history.

(56) References Cited

U.S. PATENT DOCUMENTS

| | | | |
|---|---|---|---|
| 6,147,963 A | 11/2000 | Walker et al. | |
| 6,763,477 B1 | 7/2004 | McGee | |
| 6,853,573 B2 | 2/2005 | Kim et al. | |
| 6,854,045 B2 * | 2/2005 | Ooi et al. | 711/202 |
| 6,948,036 B2 * | 9/2005 | Grieff et al. | 711/151 |
| 6,961,787 B2 * | 11/2005 | Ooi | 710/19 |
| 6,961,813 B2 * | 11/2005 | Grieff et al. | 711/112 |
| 7,047,335 B2 * | 5/2006 | Schauer et al. | 710/105 |
| 7,178,054 B2 * | 2/2007 | Seto et al. | 714/5.11 |
| 7,257,163 B2 | 8/2007 | Hwang et al. | |
| 7,284,082 B2 | 10/2007 | Greenberger | |
| 7,313,751 B2 | 12/2007 | Kang et al. | |
| 7,339,500 B2 | 3/2008 | Noda | |
| 7,343,545 B2 * | 3/2008 | Tseng et al. | 714/769 |
| 7,360,010 B2 | 4/2008 | Ghaffari et al. | |
| 7,360,119 B1 | 4/2008 | Stenfort et al. | |
| 7,384,082 B2 | 6/2008 | Blake | |
| 7,406,652 B2 | 7/2008 | Tseng et al. | |
| 7,424,628 B2 | 9/2008 | Matsumoto et al. | |
| 7,477,649 B2 * | 1/2009 | Paulson et al. | 370/412 |
| 7,496,691 B2 * | 2/2009 | Ayyavu et al. | 710/5 |
| 7,523,235 B2 * | 4/2009 | Nemazie et al. | 710/74 |
| 7,523,236 B1 * | 4/2009 | Nemazie et al. | 710/74 |
| 7,539,797 B2 * | 5/2009 | Nemazie et al. | 710/74 |
| 7,664,042 B2 * | 2/2010 | Utsunomiya et al. | 370/242 |

(Continued)

*Primary Examiner* — Joseph D Torres

(74) *Attorney, Agent, or Firm* — Muncy, Geissler, Olds & Lowe, PLLC

(57) ABSTRACT

A method for processing noise interference in a serial AT Attachment (SATA) interface. The method includes the steps of detecting whether there is an error in CRC (Cyclic Redundancy Check) checksum or whether an R_ERR primitive (reception error primitive) is received, detecting whether a FIS (Frame Information Structure) is a data type if there is any error and returning back to error state detecting step if there is no any error, detecting whether the FIS is a ATAPI packet command CDB (Command Descriptor Block) when the FIS is the data format, and writing a special tag to the CDB and returning back to the error detecting step.

9 Claims, 6 Drawing Sheets

U.S. PATENT DOCUMENTS

| | | |
|---|---|---|
| 2003/0236952 A1* | 12/2003 | Grieff et al. .................. 711/151 |
| 2003/0236953 A1* | 12/2003 | Grieff et al. .................. 711/151 |
| 2004/0019718 A1* | 1/2004 | Schauer et al. ............... 710/105 |
| 2004/0252716 A1 | 12/2004 | Nemazie |
| 2005/0144490 A1* | 6/2005 | Igari ............................ 713/300 |
| 2005/0188245 A1* | 8/2005 | Seto et al. ........................ 714/5 |
| 2005/0240855 A1 | 10/2005 | Tseng et al. |
| 2006/0095594 A1* | 5/2006 | Chen et al. ........................ 710/5 |

* cited by examiner

| sending device | receiving device | description |
|---|---|---|
| SYNC | SYNC | |
| SYNC | SYNC | |
| X_RDY | SYNC | Ready for sending data in sending device |
| X_RDY | SYNC | |
| X_RDY | R_RDY | Ready for receiving data in receiving device |
| X_RDY | R_RDY | |
| SOF | R_RDY | Packet start |
| Payload 0 | R_RDY | |
| Payload 1 | R_IP | |
| ... | ... | |
| Payload n | R_IP | |
| CRC | R_IP | |
| EOF | R_IP | Packet end |
| WTRM | R_IP | |
| WTRM | R_IP | |
| WTRM | R_OK | Receive-OK |
| WTRM | R_OK | |
| SYNC | R_OK | |
| SYNC | R_OK | |
| SYNC | SYNC | |

| | Byte 3 | Byte 2 | Byte 1 | Byte 0 |
|---|---|---|---|---|
| Dword 0 | Features | Command | C R R Reserved(0) | FIS Type (27h) |
| Dword 1 | Dev / Head | Cyl High | Cyl Low | Sector Number |
| Dword 2 | Features (exp) | Cyl High (exp) | Cyl Low (exp) | Sector Num (exp) |
| Dword 3 | Control | Reserved(0) | Sector Count (exp) | Sector Count |
| Dword 4 | Reserved(0) | Reserved(0) | Reserved(0) | Reserved(0) |

FIG. 4 (Related Art)

| | | | | |
|---|---|---|---|---|
| Dword 0 | Reserved(0) | Reserved(0) | R R R Reserved(0) | FIS Type (46h) |
| ... | | | | |
| ... | N Dwords of data | | | |
| ... | (minumum of one Dword, maxmum of 2048 Dwords) | | | |
| Dword n | | | | |

| D7 | D6 | D5 | D4 | D3 | D2 | D1 | D0 |
|---|---|---|---|---|---|---|---|
| Reserved | | | | | | Overlap | DMA |

FIG. 6

| D7 | D6 | D5 | D4 | D3 | D2 | D1 | D0 |
|---|---|---|---|---|---|---|---|
| Sense Key | | | | MCR | ABRT | EOM | ILI |

FIG. 7

| D7 | D6 | D5 | D4 | D3 | D2 | D1 | D0 |
|---|---|---|---|---|---|---|---|
| BSY | DRDY | DMA ready or DF | Service or DSC | DRQ | CORR | Reserved | Check |

FIG. 8

METHOD FOR PROCESSING NOISE INTERFERENCE

This application is a Continuation of application Ser. No. 11/039,948, filed on Jan. 24, 2005 now U.S. Pat. No. 7,343,545, and for which priority is claimed under 35 U.S.C. §120; and this application claims priority of Application No. 093111174 filed in Taiwan, R.O.C. on Apr. 22, 2004 under 35 U.S.C. §119, the entire contents of which are hereby incorporated by reference.

BACKGROUND OF THE INVENTION

1. Field of the Invention

The invention relates to a method for processing noise interference, and more particularly to a method for processing noise interference according to an error feedback mechanism of an ATA/ATAPI (AT Attachment with Packet Interface).

2. Description of the Related Art

The serial ATA (Serial Advanced Technology Attachment, hereinafter referred to as SATA) is an interface specification commonly promoted by the companies of APT, Dell, IBM, Intel, Maxtor, Seagate, etc. The SATA specification is applied to the transmission interface of a hard disk drive or an optical disk drive to replace parallel ATA/ATAPI interface that has been used for a long time. The SATA interface specification specifies two pairs of differential signal lines to replace the original 40 or 80 signal lines connected in parallel. Serializing the original data can reduce the size and voltage and increase the speed. The specification also introduces some new functions, such as flow control and error resending, to control the data stream in a simple way.

FIG. 1 is a schematic illustration showing communication layers in the SATA specification. As shown in FIG. 1, the SATA interface connects a host 11 to a device 12. The device 12 may be an optical storage device or a hard disk drive, or other devices with the SATA interface. The communication layers in the SATA specification include four layers, which are respectively a first layer (physical layer), a second layer (link layer), a third layer (transport layer) and a fourth layer (application layer). The physical layer is responsible for converting digital and analog signals. That is, the physical layer receives and converts a digital signal sent from the link layer into an analog signal and sends the analog signal to the other end. The physical layer also receives and converts the analog signal, which comes from the other end, into a digital signal and outputs the digital signal to the link layer. The link layer encodes and decodes the digital data. That is, the link layer encodes the data coming from the transport layer and outputs the encoded data to the physical layer. On the other hand, the link layer decodes the data coming from the physical layer and outputs the decoded data to the transport layer. The transport layer constructs and deconstructs the FIS (Frame Information Structure). The detailed definition of the FIS can be found in the SATA specification. The application layer is in charge of buffer memory and DMA engine(s).

During the serializing process, the sending device converts the parallel data (e.g., data in bytes or words) into a serial bit data stream. In addition to the typical data, the SATA specification defines some data control codes with four bytes, which are referred to as primitives, for controlling the sending and power management of the sending device and the receiving device. For example, a X_RDY primitive (transmission data ready primitive) represents that the sending device is ready to send data, and a R_RDY primitive (receiver ready primitive) represents that the receiving device is ready to receive data.

FIG. 2 is a schematic illustration showing a packet sent through the SATA interface. Two devices communicate with each other to send the packet according to the X_RDY primitive (transmission data ready primitive) and the R_RDY primitive (receiver ready primitive). Then, the sending side sends a packet content, which is packed by a SOF primitive (start of frame) and an EOF primitive (End of frame). After the packet content is sent completely, the sending side sends a WTRM primitive (wait for frame termination primitive). If there is no any error about the CRC (Cyclic Redundancy Check) check in the link layer, the receiving side responds with a R_OK primitive (reception with no error primitive) after it receives the WTRM primitive. If there is an error about the CRC check, the receiving side responds with a R_ERR primitive (reception error).

The FIS is for transferring the task file register and data. Two examples will be described in the following. FIG. 3 is a schematic illustration showing a task file register FIS from a host to a device. That is, a task file register written from the host to the device is shown in FIG. 3. FIG. 4 is a schematic illustration showing a data FIS from the host to the device or from the device to the host. That is, the data sent from the host to the device or from the device to the host is shown in FIG. 4.

In order to prevent the error caused by noises, the SATA specification specifies a resending mechanism. Almost all type of FISs (e.g., Register-Host to Device FIS or Set Device Bits-Device to Host FIS) are resent when a R_ERR primitive was received so as to ensure that the receiving device can receive the correct control information. However, the data FIS does not have this protection mechanism. When the data error occurs, the device cannot be protected by the resending mechanism under the condition of noise interference because the data FIS is not resent. Thus, the error data may be received. In a more serious condition, some portions of primitives may be mistaken as data bits, thereby making the number of data sets to be sent to the device greater than it should be. In some cases, this error may halt the system.

In addition, in the device (e.g., an optical storage device) using the data FIS to send the ATA/ATAPI CDB (Command Descriptor Block), the CDB cannot be protected according to the resending mechanism because the data FIS is not resent. Thus, the device receives an abnormal control command, which causes a larger influence than in the case of sending the normal data using the data FIS.

SUMMARY OF THE INVENTION

It is therefore an object of the invention to provide a method for processing noise interference in order to prevent the system from being stopped when the data FIS is interfered by noises.

To achieve the above-mentioned object, the invention provides a method for processing noise interference. The method includes the steps of detecting error states by detecting whether a CRC (Cyclic Redundancy Check) code exists error or whether an error primitive is received, detecting whether a FIS (Frame Information Structure) is a data format if there is an error state and returning back to error state detecting step if the FIS is not a data format, detecting whether the FIS is a CDB (Command Descriptor Block) when the FIS is a data format, and modifying contents of the CDB, and writing a special mark to the CDB and returning back to the error state detecting step when the FIS is not a CDB.

The method of the invention further comprises the steps of: detecting whether a data length of the FIS is correct when the FIS is not the CDB; adjusting the data length by increasing or decreasing data of the FIS so as to make the data length of the FIS correct when the data length of the FIS is incorrect; and generating an error CRC code and jumping back to the error state detecting step.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 2 is a schematic illustration showing a FIS sent through the SATA interface.

FIG. 3 is a schematic illustration showing a task file register FIS from a host to a device.

FIG. 4 is a schematic illustration showing a data FIS.

FIG. 6 is a schematic illustration showing definitions of each bit in an ATAPI Feature Register.

FIG. 7 is a schematic illustration showing definitions of each bit in an ATAPI Error Register.

FIG. 8 shows definitions of each bit in an ATAPI Status Register.

DETAILED DESCRIPTION OF THE INVENTION

The invention will be described with reference to the accompanying drawings. The invention utilizes the ATA/ATAPI error feedback mechanism to overcome the problem of system halt caused by noise interference when the data FIS is being sent. A native serial ATA device and a bridge solution may be used according to the real applications. The native serial ATA device directs to a device having a serial ATA interface serving as the data transmission interface without the conversion from the parallel ATA to the serial ATA. The bridge solution can convert the parallel ATA interface to the serial ATA interface so as to provide a solution in a transitional stage.

Figure 1:
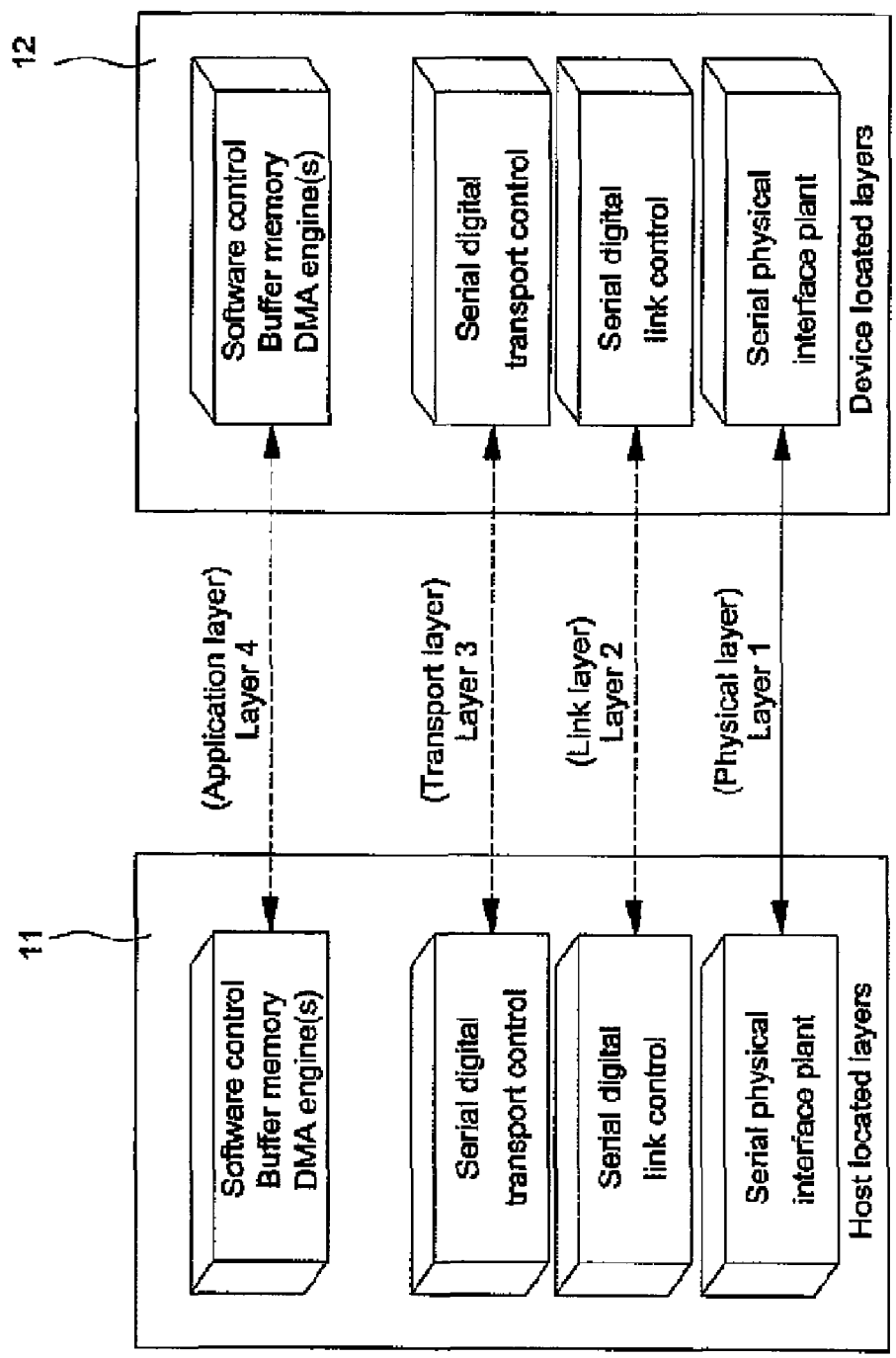
FIG. 1 is a schematic illustration showing communication layers in the SATA specification.
Figure 5:
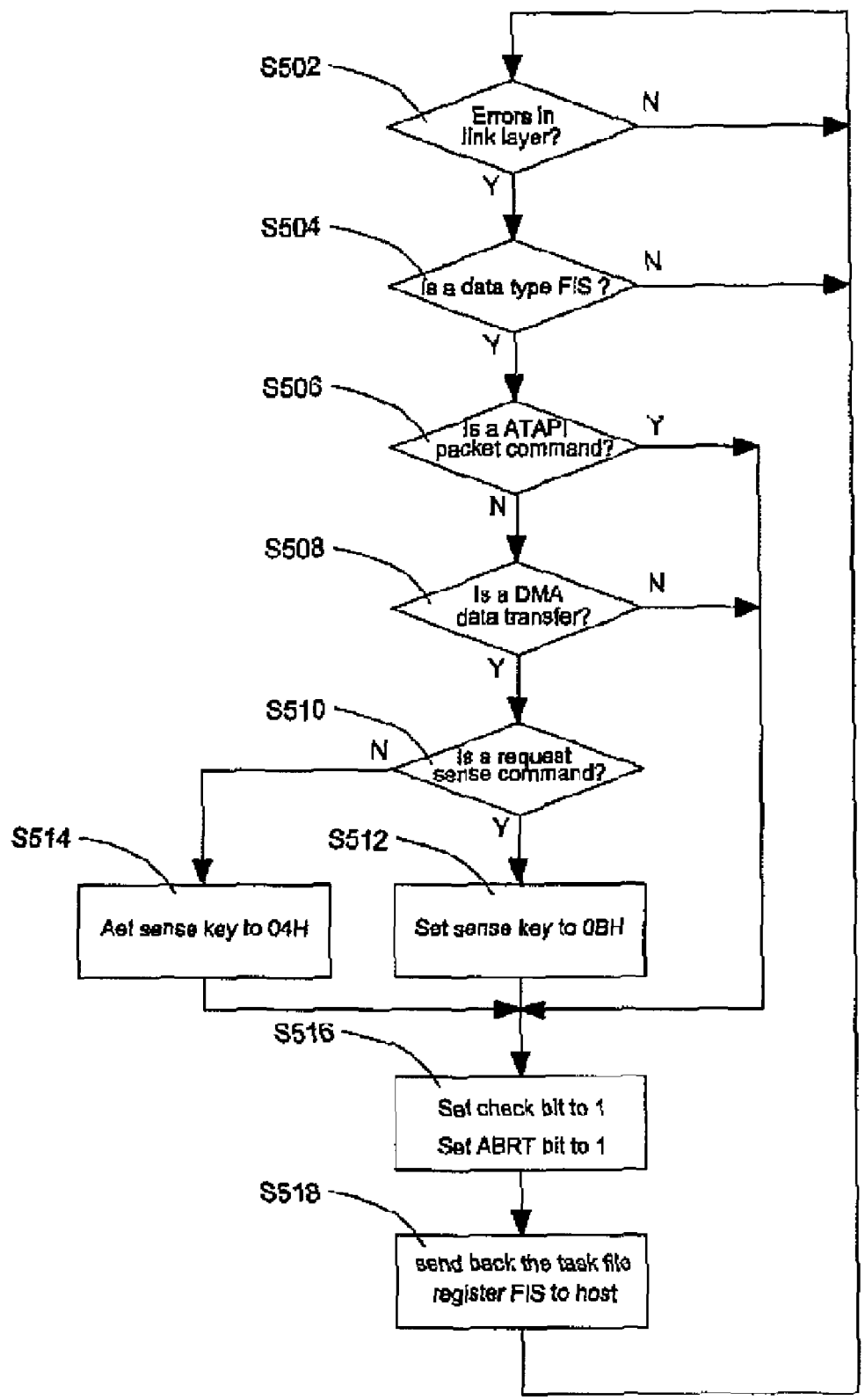
FIG. 5 is a flow chart showing a method of the invention for processing noise interference in an ATA/ATAPI device.

FIG. 5 is a flow chart showing a method of the invention for processing noise interference in a native ATA/ATAPI device. The flow chart illustrates the implementation of advanced processing when there is a CRC error in the link layer or the link layer receives a R_ERR primitive. The method of the invention for processing the noise interference will be described with reference to FIG. 5.

Step S502 is to detect whether the link layer has detected an error state. The error state includes the CRC error, the receiving of the R_ERR primitive, or the receiving of the improper error primitive. If the link layer has not detected any error state, step S502 is repeated. If the link layer has detected an error state, the process jumps to step S504.

Step S504 is to judge whether the FIS is a data type FIS. As shown in FIGS. 3 and 4, the first byte (Byte 0) of each FIS is the FIS type. If the first byte is 46H, it represents that the FIS is a data type FIS, and the process jumps to step S506. If the first byte is not 46H, the process returns back to step S502.

Step S506 is to judge whether the FIS is an ATAPI packet command. When the host wants to send the packet command to the optical storage device, the host firstly sends the task file register FIS with the command register value of A0H to the optical storage device. So, when the optical storage device receives the command register value of A0H, it knows that there are subsequent 12 bytes of ATAPI packet commands. The first byte is the operation code, and the subsequent 11 bytes are the supplement data. If the FIS is an ATAPI packet command, the process jumps to step S516. Otherwise the process jumps to step S508.

Step S508 is to judge whether the FIS is a DMA (Direct Memory Access) mode data transfer. FIG. 6 is a schematic illustration showing definitions of each bit in an ATAPI feature register. As shown in FIG. 6, bit 0(D0) is the DMA mode. Thus, whether the DMA mode data transfer exists may be detected as long as the data of bit 0 of the feature register is asserted. The definitions and functions of other bits may be found in the ATAPI specification. If the FIS is not a DMA mode data transfer, the process jumps to step S516. If the FIS is a DMA mode data transfer, the process jumps to step S510.

Step S510 is to judge whether there is a request sense command (packet command with operation code 03h). When the host wants to send the packet command to the optical storage device, the host will firstly send the task file register FIS with the command register value of A0H to the optical storage device. So, after the optical storage device receives the command register value of A0H, it knows that there are subsequent 12 bytes of ATAPI packet command. The first byte is the command mode, and the subsequent 11 bytes are the supplement data. When the first byte is 03H, it represents that the command is a request sense command. So, whether there is a request sense command can be detected by recognizing whether the first byte of the ATAPI packet command is 03H. If there is not a request sense command, the process jumps to step S512; or otherwise the process jumps to step S514.

Step S512 is to set the sense key of the task file register FIS to 0BH and then the process jumps to step S516. FIG. 7 is a schematic illustration showing definitions of each bit in an ATAPI error register, wherein D4 to D7 are the sense keys. There is a conventional way for the parallel ATA device to deal with the noise interference during the DMA mode data transmission. When the CRC has errors, the device will set the sense key to 04H to inform the host. While an exception exists, when the executing command is the request sense command, the sense key is set to 0BH. The detail definition of the sense key may be found in the associated ATAPI specification.

Step S514 is to set the sense key of the task file register FIS to 04H and then the process jumps to step S516.

Step S516 is to set the check bit of the status register to 1 and set the ABRT bit of the error register to 1. FIG. 8 shows definitions of each bit in an ATAPI status register. As shown in FIG. 8, the bit 0 of the status register is the CHECK bit. As shown in FIG. 7, the bit 2 of the error register is the ABRT bit. When the check bit of the status register is 1, it indicates that an error occurred during execution of the previous command. The bits in the Error Register contain the Sense Key and Code. When the ABRT bit of the error register is 1, it indicates command aborted.

Step S518 is to send back the task file register FIS from the device to the host, and then the process jumps back to step S502.

Therefore, the method of the invention utilizes the ATA/ATAPI error feedback mechanism to process the noise interference according to the above-mentioned steps. Because the ABRT bit of the error register is set to 1 when the data FIS encounters the noise interference, the device requests the other side to resent whole FIS so as to effectively eliminate the problem of system halt caused by the noise interference when the data FIS is being sent.

Figure 9:
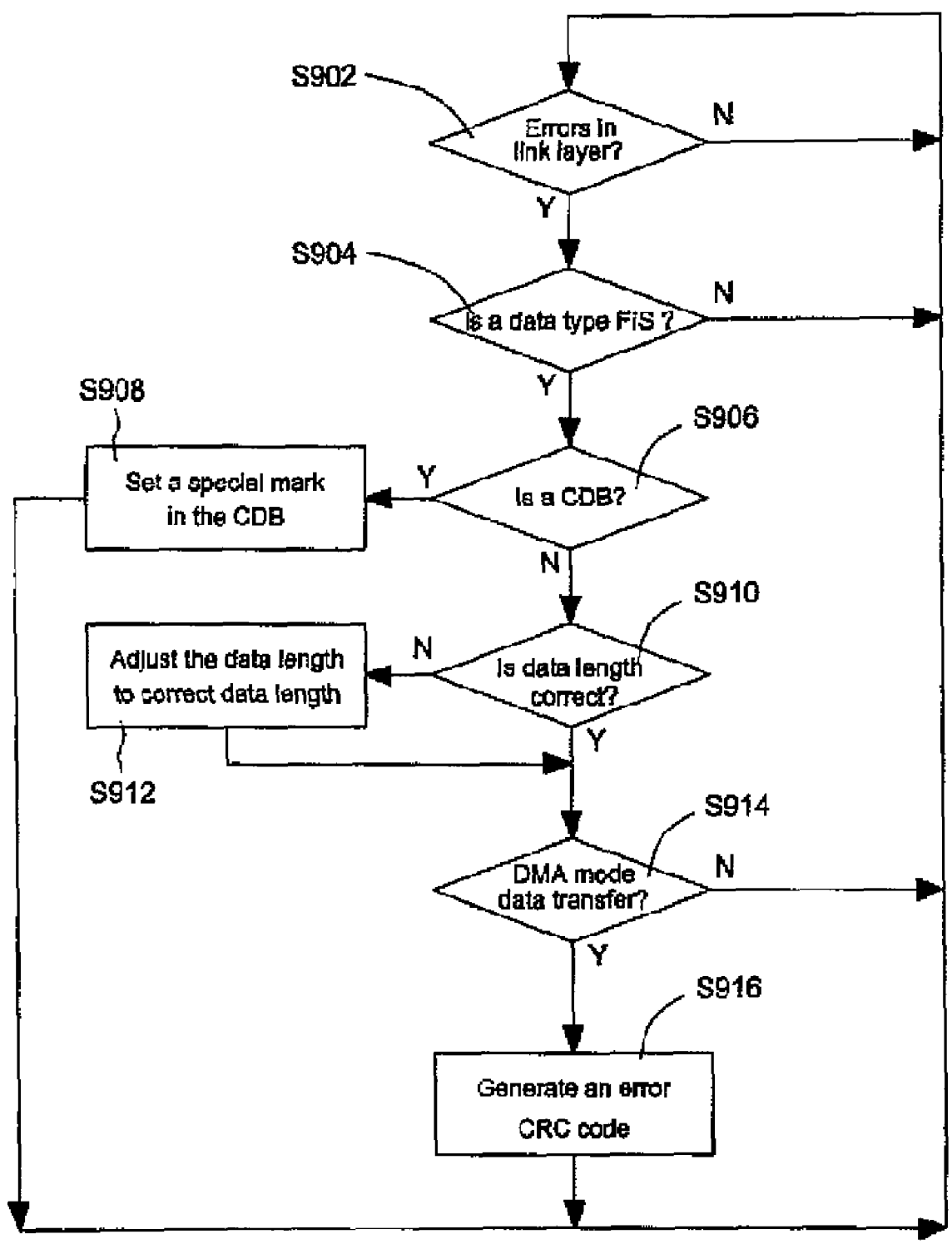
FIG. 9 is a flow chart showing a method of the invention for processing noise interference in a bridge solution.

The method of FIG. 5 is used in the accessing device that directly receives the SATA interface signal. The invention additionally proposes a method of bridge solution to connect the data accessing device of the parallel ATA interface to the SATA interface, wherein the accessing device itself only receives the parallel ATA interface data. FIG. 9 is a flow chart showing a method of the invention for processing noise interference in a bridge solution. The bridge solution is disposed between the serial ATA interface and the parallel ATA interface of a data accessing device (e.g., an optical storage device). The flow chart is an advanced implementation when the link layer detects a CRC error or receives the receive-error primitive. The method of the invention for processing the noise interference in the bridge solution will be described with reference to FIG. 9.

Step S902 is to detect whether the link layer has any error. The error state includes the CRC error, the receiving of the R_ERR primitive, or the receiving of the improper error primitive. If the link layer has not detected any error, step S902 is repeated. If the link layer has detected an error, the process jumps to step S904.

Step S904 is to judge whether the FIS is a data type FIS. As shown in FIGS. 3 and 4, the first byte of each FIS is used to indicate the FIS type. That is, if the first byte is 27H, it represents that the FIS is a task file register FIS, and the process jumps back to step S902; and if the first byte is 46H, it represents that the FIS is a data type FIS, and the process jumps to step S906.

Step S906 is to judge whether there is a command descriptor block CDB. When the host wants to send the packet command to the optical storage device, the host will firstly send the task file register FIS with the command register value of A0H to the optical storage device. So, after the optical storage device receives the command register value of A0H, it knows there are subsequent 12 bytes of ATAPI packet command. The first byte is the command mode and the subsequent 11 bytes are the supplement data. If there is a CDB, the process jumps to step S908. If there is not a CDB, the process jumps to step S910.

Step S908 is to set a special mark in the CDB and then the process jumps back to step S902. For example, FFH is written into the CDB.

Step S910 is to detect whether the data length is correct. If the data length is correct, the process jumps to step S914. Otherwise, the process jumps to step S912.

Step S912 is to adjust the data length to correct data length and then the process jumps to step S914. For example, if the data length is not enough, the insufficient data is added; and if the data length is too long, the redundant data is discarded.

Step S914 is to judge whether there is a DMA mode data transfer As shown in FIG. 6, the bit 0 (D0) is the DMA mode. Thus, whether the DMA mode data transfer exists may be judged by only checking the data of bit 0 of the feature register. The definitions and functions of other bits may be found in the ATAPI specification, If there is not a DMA mode data transfer, the process jumps to step S902. Otherwise the process jumps to step S916.

Step S916 is to generate an error CRC code at the parallel ATA interface, and then the process jumps back to step S902.

Thus, the existing accessing device with the parallel ATA interface may be serially connected to the bridge solution, and the control method of FIG. 9 may be adopted. The accessing device with the parallel ATA interface can be connected to the SATA interface via the bridge solution and error information is added to the parallel ATA interface when the data FIS encounters the noise interference such that the device could request the data to be to resent. Thus, the problem of system halt caused by the noise interference when the data type FIS is being sent may be effectively solved. In summary, the method of the invention for processing noise interference in the bridge solution includes the following steps.

1. When the bridge solution receives the ATAPI CDB data packet (Data FIS) with noise interference, it sends the CDB with a special mark to the parallel ATA end, as shown in step S908, for example. This special mark is defined as abnormal ATAPI CDB type, so the device sends back the error state such that the computer resends this data packet (Data FIS).

2. When some primitives are mistaken as data bits because the data FIS encounters the noise interference, only the desired number of data sets to be sent is outputted to the device, as shown in steps S910 and S912, for example.

3. When the data is sent in the DMA mode and the data FIS encounters the interference because the SATA signal line has noises, the erroneous CRC is outputted to the device at the parallel ATA end. Thus, the host is enabled to resend the original command and information according to the error state response of the device, as shown in steps S914 and S916, for example.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A method for processing noise interference in a data accessing device with a SATA (Serial Advanced Technology Attachment) interface, the method comprising:
    an error detecting step for detecting whether there is a CRC (Cyclic Redundancy Check) error, whether an reception error primitive (R_ERR primitive) is received, whether an improper primitive is received, or whether a LINK layer error is detected, and repeating this step if there is no any error;
    a type detecting step for detecting whether an FIS (Frame Information Structure) is a data type FIS;
    a responding step for asserting the CHECK bit of the ATAPI Status Register when the FIS is data type; and sending back the response.

2. The method according to claim 1, wherein the responding step further comprising asserting the ABRT bit of the ATAPI Error Register.

3. The method according to claim 1, wherein the method is used in an optical storage device connected to the SATA interface.

4. The method according to claim 1, further comprising:
    an ATAPI (AT Attachment with Packet Interface) packet command detecting step for detecting whether the FIS is an ATAPI packet command when the FIS is data type, and executing the responding step if the FIS is the ATAPI packet command; and
    a DMA (Direct Memory Access) mode data transfer detecting step for detecting whether there is a DMA mode data transfer when the data FIS is not the ATAPI packet command, and executing the responding step if there is not a DMA mode data transfer.

5. The method according to claim 4, wherein the method is used in an optical storage device connected to the SATA interface.

6. The method according to claim 4, further comprising:
a request sense command detecting step for detecting whether the present command is a request sense command when there is a DMA mode data transfer;
setting a sense key of the ATAPI Error Register to 11 and executing the responding step if the present command is the request sense command; and
setting the sense key of the ATAPI Error Register to 4 and executing the responding step if the present command is not the request sense command.

7. The method according to claim 6, wherein the method is used in an optical storage device connected to the SATA interface.

8. The method according to claim 1, wherein the error state detecting step is performed in a link layer.

9. The method according to claim 8, wherein the method is used in an optical storage device connected to the SATA interface.

* * * * *